(12) United States Patent
Liang (10) Patent No.: US 11,522,970 B2
(45) Date of Patent: Dec. 6, 2022

(54) METHOD FOR PUSHING MULTIMEDIA INFORMATION, NON-TRANSITORY COMPUTER READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Kun Liang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 388 days.

(21) Appl. No.: 16/700,570

(22) Filed: Dec. 2, 2019

(65) Prior Publication Data
US 2020/0106848 A1    Apr. 2, 2020

Related U.S. Application Data (63) Continuation of application No. PCT/CN2017/091382, filed on Jun. 30, 2017.

(51) Int. Cl.
*H04L 67/55*    (2022.01)
*G08G 1/052*    (2006.01)
(Continued)

(52) U.S. Cl.
CPC ............ *H04L 67/55* (2022.05); *G06V 20/597* (2022.01); *G08G 1/0133* (2013.01); *G08G 1/052* (2013.01); *G08G 1/0968* (2013.01); *G10L 25/63* (2013.01); *H04L 65/60* (2013.01)

(58) Field of Classification Search
CPC ....... H04L 67/26; H04L 65/60; G06V 20/597; G08G 1/0133; G08G 1/052; G08G 1/0968;
(Continued)

(56) References Cited

U.S. PATENT DOCUMENTS

| | | | |
|---|---|---|---|
| 3,035,023 | A1 | 10/2011 | Hernandez et al. |
| 2011/0054646 | A1 | 3/2011 | Hernandez et al. |
| 2017/0102765 | A1* | 4/2017 | Yoneda .............. G01C 21/3484 |

FOREIGN PATENT DOCUMENTS

| | | |
|---|---|---|
| CN | 102529979 A | 7/2012 |
| CN | 104340145 A | 2/2015 |

(Continued)

OTHER PUBLICATIONS

The first office action with English Translation issued in corresponding CN application No. 201780091995.9 dated Oct. 26, 2020.
(Continued)

*Primary Examiner* — Yuen Wong
(74) *Attorney, Agent, or Firm* — Young Basile Hanlon & MacFarlane, P.C.

(57) ABSTRACT

A method for pushing multimedia information, an electronic device, and a non-transitory computer readable storage medium are provided. The method includes the following. Upon detecting that a vehicle is in a traveling state and the vehicle is traveling at a speed lower than a preset speed threshold within a preset time period, navigation data of the vehicle is provided. Duration that the vehicle is in a congestion state is estimated according to the navigation data. Collect scene information in the vehicle. Push multimedia information according to the duration that the vehicle is in the congestion state and the scene information in the vehicle.

18 Claims, 4 Drawing Sheets

(51) Int. Cl.
  *G08G 1/0968*  (2006.01)
  *H04L 65/60*   (2022.01)
  *G06V 20/59*   (2022.01)
  *G08G 1/01*    (2006.01)
  *G10L 25/63*   (2013.01)

(58) Field of Classification Search
  CPC .. G08G 1/0112; G10L 25/63; G01C 21/3492; G10H 2240/085; G06F 16/436
  See application file for complete search history.

(56) References Cited

FOREIGN PATENT DOCUMENTS

| | | | | |
|---|---|---|---|---|
| CN | 105741556 A | * | 7/2016 | ............ G08G 1/01 |
| CN | 105894700 A | | 8/2016 | |
| CN | 106652378 A | | 5/2017 | |
| DE | 102005051175 A1 | | 4/2007 | |
| DE | 102013009579 A1 | | 12/2014 | |
| EP | 1378912 A2 | | 1/2004 | |
| KR | 20100068831 A | | 6/2010 | |

OTHER PUBLICATIONS

Indian Examination Report for IN Application 201917047333 dated Mar. 15, 2021. (5 pages).
International search report issued in corresponding international application No. PCT/CN2017/091382 dated Mar. 20, 2018.
Extended European search report issued in corresponding European application No. 17916221.9 dated Apr. 21, 2020.

* cited by examiner

METHOD FOR PUSHING MULTIMEDIA INFORMATION, NON-TRANSITORY COMPUTER READABLE STORAGE MEDIUM, AND ELECTRONIC DEVICE

CROSS-REFERENCE TO RELATED APPLICATION(S)

This application is a continuation of International Application No. PCT/CN2017/091382, filed on Jun. 30, 2017, the disclosure of which is hereby incorporated by reference in its entirety.

TECHNICAL FIELD

This disclosure relates to the technical field of communication, and more particularly to a method for pushing multimedia information, a non-transitory computer readable storage medium, and an electronic device.

BACKGROUND

With the increasingly economic improvement, an increasing number of people have their own vehicles, and most people like to travel by their own vehicles. As a result, road congestion is getting serious. When road congestion occurs, what is frequently to do is to set another travel route for the driver to avoid congestion. However, it is insufficient to do this alone.

SUMMARY

According to a first aspect, a method for pushing multimedia information is provided. The method includes the following. Upon detecting that a vehicle is in a traveling state and the vehicle is traveling at a speed lower than a preset speed threshold within a preset time period, navigation data of the vehicle is obtained. Duration that the vehicle is in a congestion state is estimated according to the navigation data. Scene information in the vehicle is collected. Push multimedia information according to the duration that the vehicle is in the congestion state and the scene information in the vehicle.

According to a second aspect, an electronic device is provided. The electronic device includes a processor and a memory. The memory is configured to store multiple instructions. The multiple instructions, when executed, are operable with the processor to: obtain navigation data of a vehicle, upon detecting that the vehicle is in a traveling state and the vehicle is traveling at a speed lower than a preset speed threshold within a preset time period; estimate duration that the vehicle is in a congestion state according to the navigation data; collect scene information in the vehicle; push multimedia information according to the duration that the vehicle is in the congestion state and the scene information in the vehicle.

According to a third aspect, a non-transitory computer readable storage medium is provided. The computer programs, when executed, are operable with a computer to: obtain navigation data of a vehicle, upon detecting that the vehicle is in a traveling state and the vehicle is traveling at a speed lower than a preset speed threshold within a preset time period; estimate duration that the vehicle is in a congestion state according to the navigation data; collect scene information in the vehicle; push multimedia information according to the duration that the vehicle is in the congestion state and the scene information in the vehicle.

DETAILED DESCRIPTION

Technical solutions embodied in implementations of the disclosure will be described in a clear and comprehensive manner in conjunction with the accompanying drawings. It is evident that the implementations described herein are merely some rather than all the implementations of the disclosure. All other implementations obtained by those of ordinary skill in the art based on the implementations of the disclosure without creative efforts shall fall within the protection scope of the disclosure.

When a vehicle is traveling on a congested road, the exiting processing methods mostly focus on the travel itself. For example, other travel routes may be planned for the driver without regard to the emotional state of users in the vehicle. However, in fact, once road congestion occurs, it is easy to cause fluctuations in the emotional states of the users in the vehicle, for example, it may make the users feel agitated or irritable. If these negative emotions cannot be overcome in time, it will affect travel comfort and even lead to a certain security risk.

According to implementations, a method for pushing multimedia information is provided. The method includes the following. Upon detecting that a vehicle is in a traveling state and the vehicle is traveling at a speed lower than a preset speed threshold within a preset time period, navigation data of the vehicle is obtained. Duration that the vehicle is in a congestion state is estimated according to the navigation data. Collect scene information in the vehicle and push multimedia information according to the duration that the vehicle is in the congestion state and the scene information in the vehicle.

In at least one implementation, the duration that the vehicle is in the congestion state is estimated as follows. A length of a congested road on which the vehicle is currently traveling is obtained according to the navigation data. The duration that the vehicle is in the congestion state is estimated according to the length of the congested road and a current traveling speed of the vehicle. Alternatively, the number of vehicles on the congested road is obtained according to the navigation data, and the duration that the vehicle is in the congestion state is estimated according to the number of vehicles on the congested road.

In at least one implementation, push the multimedia information according to the duration that the vehicle is in the congestion state and the scene information in the vehicle as follows. Emotional states of at least one user in the vehicle are determined by analyzing the scene information in the vehicle. Push the multimedia information according to the duration that the vehicle is in the congestion state and the emotional states of the at least one user in the vehicle.

In at least one implementation, the method further includes the following. Push another multimedia information when at least one of following conditions changes: the duration that the vehicle is in the congestion state and the emotional states of the at least one user in the vehicle.

In at least one implementation, the method further includes the following. Stop pushing the multimedia information, upon detecting that the vehicle is in the traveling state and the vehicle is traveling at a speed higher than the preset speed threshold within the preset time period.

In at least one implementation, the emotional states of the at least one user in the vehicle include an emotional state of a driver and emotional states of other users in the vehicle. Push the multimedia information according to the duration that the vehicle is in the congestion state and the emotional states of the at least one user in the vehicle as follows. First multimedia push information is generated according to the duration that the vehicle is in the congestion state, the emotional state of the driver, and at least one of previous play records of the vehicle or previous play records of an electronic device communicating with the vehicle, and second multimedia push information is generated according to the duration that the vehicle is in the congestion state, the emotional states of the other users in the vehicle, and data in at least one of a database of the vehicle or a database of the electronic device. The first multimedia push information and the second multimedia push information are displayed sequentially.

In at least one implementation, the first multimedia push information is displayed before the second multimedia push information.

Figure 1:
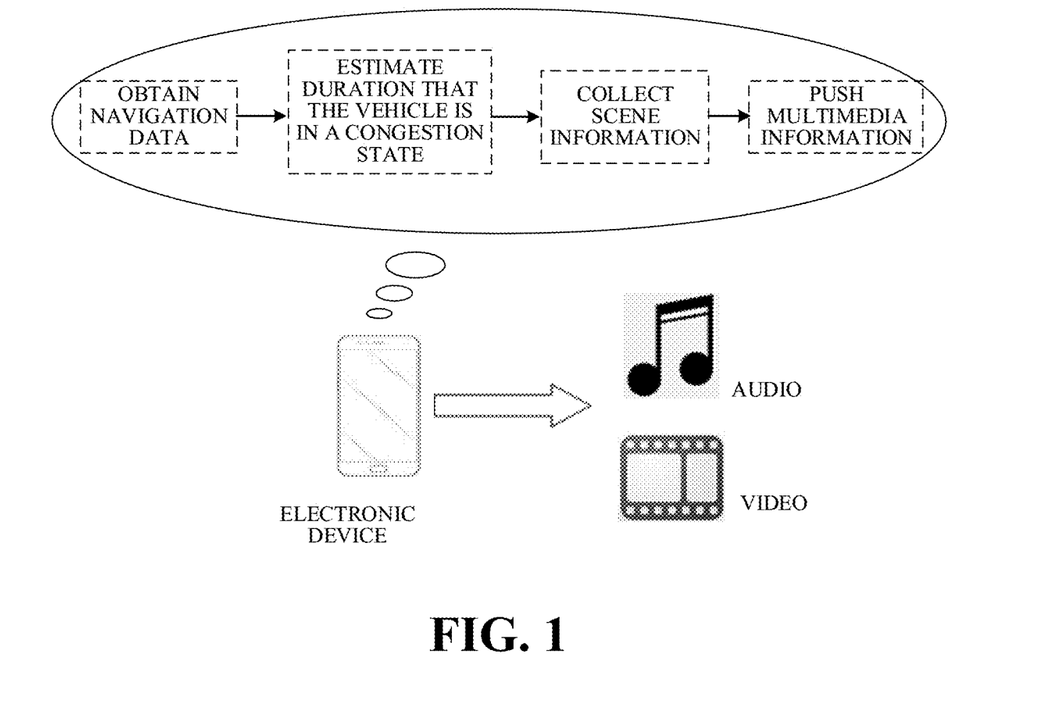
FIG. 1 is a schematic diagram illustrating a scenario to which a method for pushing multimedia information is applied according to at least one implementation.

The following will be described from the perspective of an apparatus for pushing multimedia information. The apparatus can be integrated into an electronic device. The electronic device may be a smart phone, a tablet PC or the like. The electronic device may be an electronic device of a driver. As illustrated in FIG. 1, during traveling of the vehicle, the electronic device of the driver can detect a traveling state of the vehicle. Upon detecting that the vehicle is in the traveling state and the vehicle is traveling at a speed lower than a preset speed threshold within a preset time period, it indicates the vehicle is in a congestion state. In this case, navigation data of the vehicle is obtained, and duration that the vehicle is in the congestion state is estimated according to the navigation data. Collect scene information in the vehicle, where the scene information may include data such as sounds, videos, and pictures in the vehicle. Push multimedia information according to the duration that the vehicle is in the congestion state and the scene information in the vehicle. For example, some music, short films, and movies are recommended to at least one user in the vehicle. With this intelligent push method, it is possible to alleviate negative emotions of the at least one user in the vehicle that are brought by traffic congestion, and improve the travel comfort experience.

Figure 2:
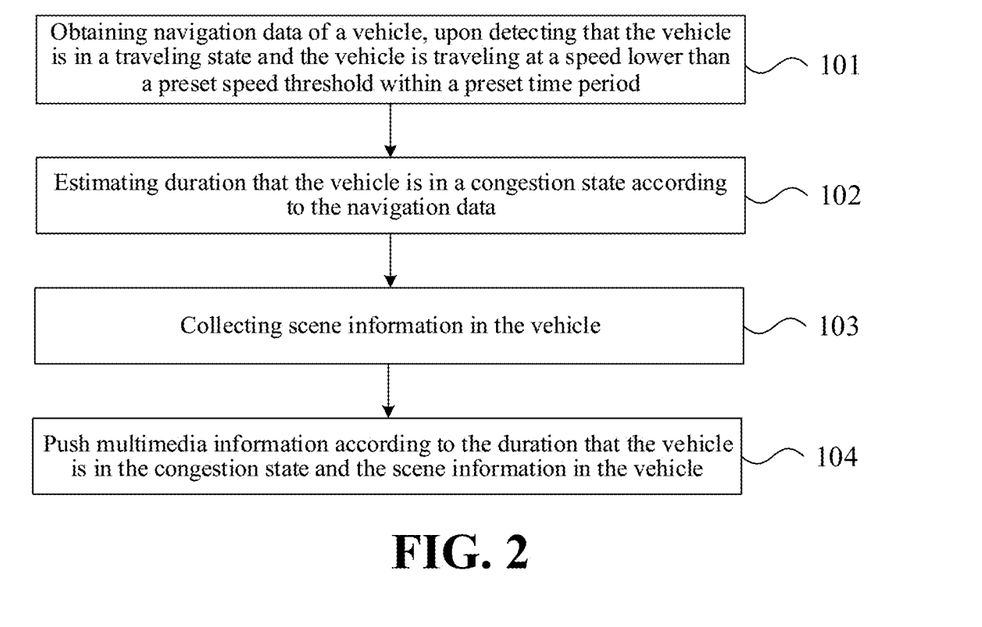
FIG. 2 is a schematic flow chart illustrating a method for pushing multimedia information according to at least one implementation.

In at least one implementation, a method for pushing multimedia information is provided. FIG. 2 is a schematic flow chart illustrating a method for pushing multimedia information according to at least one implementation. The method begins at block 101.

At block 101, navigation data of a vehicle is obtained, upon detecting that the vehicle is in a traveling state and the vehicle is traveling at a speed lower than a preset speed threshold within a preset time period.

In one example, upon detecting that the vehicle is in the traveling state and the vehicle is traveling at the speed lower than the preset speed threshold within the preset time period, it indicates that the vehicle is in a congestion state. The preset time period and the preset speed threshold may be self-customized according to actual needs. For example, the preset time period may be set to be 5 minutes, 10 minutes, or the like, and the preset speed threshold may be set to be 10 kilometers per hour (10 km/hr), 15 kilometers per hour (15 km/hr) or the like.

In one example, a navigation system can be launched for travel navigation. The navigation system can report road traffic condition in real time, such as a length of a congested road on which the vehicle is currently traveling, the level of the road traffic congestion and the like, and then plan new travel routes in real time. In one example, the navigation system can be an in-vehicle navigation system or a navigation system (such as a navigation APP) on the electronic device of the driver.

As an example, if the navigation system is the in-vehicle navigation system, the electronic device of the driver may be set to communicate with the vehicle via a Bluetooth connection or other wired or wireless connection in advance, and the navigation data of the vehicle can be obtained through the communication connection. As another example, if the navigation system is the navigation system on the electronic device, the navigation data of the vehicle can be directly obtained.

At block 102, duration that the vehicle is in a congestion state is estimated according to the navigation data.

In at least one implementation, the duration that the vehicle is in the congestion state is estimated as follows. A length of a congested road on which the vehicle is currently traveling is obtained according to the navigation data. The duration that the vehicle is in the congestion state is estimated according to the length of the congested road and a current traveling speed of the vehicle. The current traveling speed of the vehicle may be measured through a speed measuring module of the electronic device.

In some implementations, the duration that the vehicle is in the congestion state may also be estimated as follows. The number of vehicles on the congested road is obtained according to the navigation data and the duration that the vehicle is in the congestion state is estimated according to the number of vehicles on the congested road. As an example, the electronic device may send information to a pavement monitoring server to query about the number of vehicles currently traveling on the congested road and the number of vehicles that the congested road can carry (smooth flow of traffic). Thereafter, the electronic device calculates a difference between the number of vehicles currently traveling on the congested road and the number of vehicles that the congested road can carry and estimates the duration that the vehicle is in the congestion state according to a preset correspondence relationship between different differences and different duration. The correspondence relationship may be illustrated in the following table:

| difference | duration |
|---|---|
| 1~5 | 5 minutes |
| 6~10 | 15 minutes |
| 11~20 | 30 minutes |

The above two methods are only illustrative. Other methods can also be used to estimate the duration that the vehicle is in the congestion state, which is not limited herein.

At block 103, scene information in the vehicle is collected.

In at least one implementation, upon detecting that the vehicle is in the congestion state, an audio/video device can be automatically launched/switched on to collect scenario in the vehicle so as to obtain the scene information in the vehicle. For example, the audio/video device may be launched/switched on to collect sounds, videos, and images in the vehicle.

The audio/video device may be an audio/video device (an audio/video APP) on the electronic device of the driver or may be an audio/video device in the vehicle. As an example, if the audio/video device is the audio/video device in the vehicle, the electronic device can switch on the audio/video device in the vehicle through the communication connection between the vehicle and the electronic device. After the audio/video device of the vehicle is launched/switched on, the electronic device can obtain content recorded by the audio/video device of the vehicle through the communication connection between the vehicle and the electronic device.

At block 104, multimedia information is pushed according to the duration that the vehicle is in the congestion state and the scene information in the vehicle.

In at least one implementation, emotional states of at least one user in the vehicle may be determined by analyzing the scene information in the vehicle, where the emotional states may be boredom, loss, annoyance, anxiety, crying, restlessness, and so on. The multimedia information is pushed according to the duration that the vehicle is in the congestion state and the emotional states of the at least one user in the vehicle. The multimedia information pushed includes but is not limited to music, a radio show, a video, a short film and so on.

For example, upon determining that the emotional state of one of the at least one user in the vehicle is anxiety and the duration that the vehicle is in the congestion state is 5 minutes, a light music of about 5 minutes can be recommended to the at least one user in the vehicle. For another example, upon determining that the emotional state of one of the at least one user in the vehicle is crying (for instance, there is a child in the vehicle) and the duration that the vehicle is in the congestion state is 5 minutes, a children's song of about 5 minutes can be recommended to the at least one user in the vehicle.

In addition, user's preference, user's previous play records, and user's interest tags can also be combined to push multimedia information, which is not limited herein.

In at least one implementation, when at least one of following conditions changes: the duration that the vehicle is in the congestion state and the emotional states of the at least one user in the vehicle, another multimedia information is pushed. For example, if the previously estimated duration that the vehicle is in the congestion state is 5 minutes, a light music is recommended to the at least one user in the vehicle. However, 5 minutes later, the duration that the vehicle is in the congestion state may become 30 minutes, and then a short film of about 30 minutes can be recommended to the at least one user in the vehicle.

In at least one implementation, upon detecting that the vehicle is in the traveling state and the vehicle is traveling at a speed higher than the preset speed threshold within the preset time period, it means that the congested road is clear, and in this case, the push of the multimedia information can be stopped so that the driver can concentrate on driving.

According to the foregoing implementations, the method for pushing multimedia information is applicable to the electronic device. The traveling state of the vehicle is detected. Upon detecting that the vehicle is in the traveling state and the vehicle is traveling at the speed lower than the preset speed threshold within the preset time period, the navigation data of the vehicle is obtained. The duration that the vehicle is in the congestion state is estimated according to the navigation data. Collect scene information in the vehicle and push multimedia information according to the duration that the vehicle is in the congestion state and the scene information in the vehicle. With the above method, upon detecting that the vehicle is traveling on the congested road, it is possible to push multimedia information for the at least one user in the vehicle according to the duration that the vehicle is in the congestion state and the scene information in the vehicle, such that the emotional states of the at least one user in the vehicle may be improved, and the push of the multimedia information may be intelligent.

Figure 3:
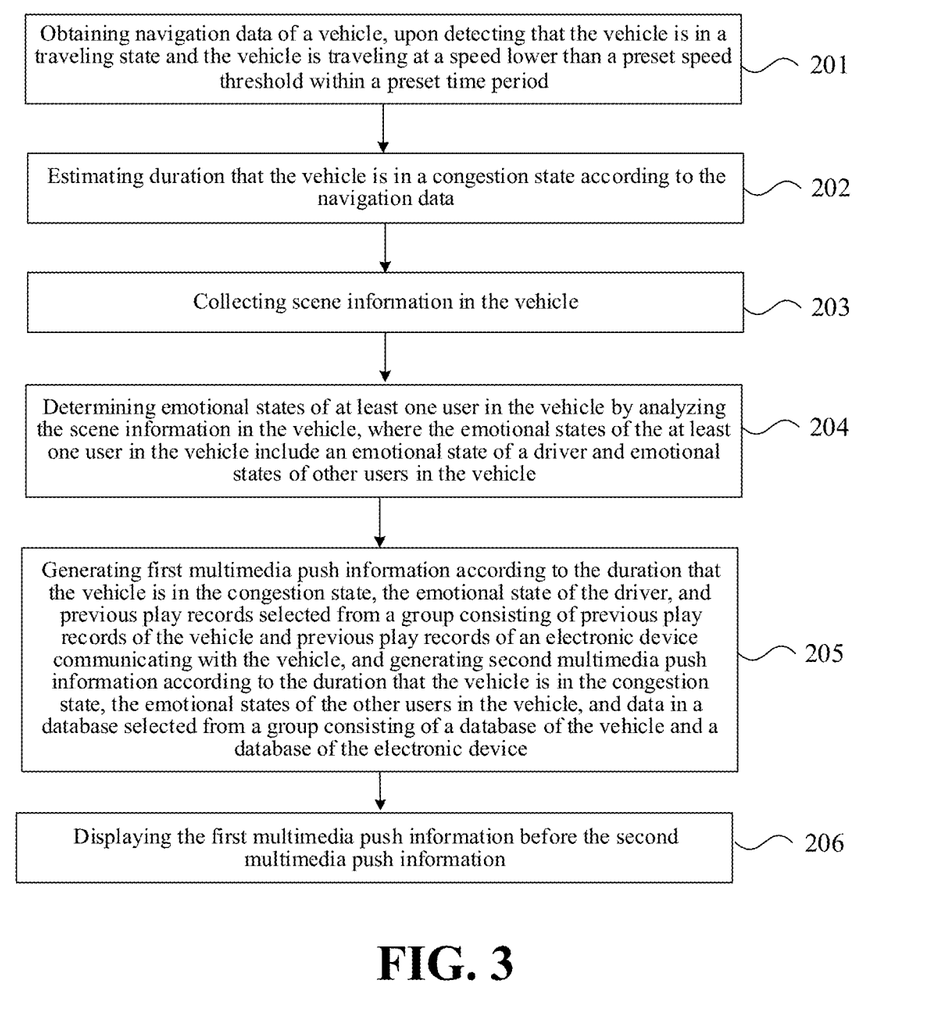
FIG. 3 is another schematic flow chart illustrating a method for pushing multimedia information according to at least one implementation.

The method described in the above implementations will be further explained below. As illustrated in FIG. 3, the method begins at block 201.

At block 201, navigation data of a vehicle is obtained, upon detecting that the vehicle is in a traveling state and the vehicle is traveling at a speed lower than a preset speed threshold within a preset time period.

In one example, upon detecting that the vehicle is in the traveling state and the vehicle is traveling at the speed lower than the preset speed threshold within the preset time period, it indicates that the vehicle is in a congestion state. The preset time period and the preset speed threshold may be set by a user himself/herself according to actual needs. For example, the preset time period may be set to be 5 minutes, 10 minutes, or the like, and the preset speed threshold may be set to be 10 kilometers per hour (10 km/hr), 15 kilometers per hour (15 km/hr), or the like.

In one example, during traveling, a navigation system may be used. The navigation system can report road traffic condition in real time, such as a length of a congested road on which the vehicle is currently traveling, the level of the road traffic congestion and so on, and then plan new travel routes in real time. In one example, the navigation system can be an in-vehicle navigation system or a navigation system (such as a navigation APP) on the electronic device of the driver.

As an example, if the navigation system is the in-vehicle navigation system, the electronic device of the driver can be set to communicate with the vehicle via a Bluetooth connection or other wired or wireless connection in advance, and the navigation data of the vehicle can be obtained through the communication connection. As another example, if the navigation system is the navigation system on the electronic device, the navigation data of the vehicle can be directly obtained.

At block 202, duration that the vehicle is in a congestion state is estimated according to the navigation data.

In at least one implementation, the duration that the vehicle is in the congestion state is estimated as follows. A length of a congested road on which the vehicle is currently traveling is obtained according to the navigation data. The duration that the vehicle is in the congestion state is estimated according to the length of the congested road and a current traveling speed of the vehicle. The current traveling speed of the vehicle may be measured through a speed measuring module of the electronic device.

In some implementations, the duration that the vehicle is in the congestion state may also be estimated as follows. The number of vehicles on the congested road is obtained according to the navigation data, and the duration that the vehicle is in the congestion state is estimated according to the number of vehicles on the congested road. As an example, the electronic device may send information to a pavement monitoring server, to query about the number of vehicles currently traveling on the congested road and the number of vehicles that the congested road can carry (smooth flow of traffic). Thereafter, the electronic device calculates a difference between the number of vehicles currently traveling on the congested road and the number of vehicles that the congested road can carry and estimates the duration that the vehicle is in the congestion state according to a preset correspondence relationship between different differences and different duration.

The above two methods are merely for illustrating, and other methods can also be used to estimate the duration that the vehicle is in the congestion state, which is not limited herein.

At block 203, scene information in the vehicle is collected.

In at least one implementation, upon detecting that the vehicle is in the congestion state, an audio/video device can be automatically launched/switched on to collect scenario in the vehicle, so as to obtain the scene information in the vehicle. For example, the audio/video device may be launched/switched on to collect sounds, videos, and images in the vehicle.

The audio/video device may be an audio/video device (an audio/video APP) on the electronic device of the driver or may be an audio/video device in the vehicle. As an example, if the audio/video device is the audio/video device in the vehicle, the electronic device can switch on the audio/video device in the vehicle through the communication connection between the vehicle and the electronic device. After the audio/video device of the vehicle is launched/switched on, the electronic device can obtain content recorded by the audio/video device of the vehicle through the communication connection between the vehicle and the electronic device.

At block 204, emotional states of at least one user in the vehicle is determined by analyzing the scene information in the vehicle, where the emotional states of the at least one user in the vehicle include an emotional state of a driver and emotional states of other users in the vehicle.

As an example, when the content is obtained according to a picture on a scenario in the vehicle, the picture can be analyzed to recognize the driver and at least one passenger (other users in the vehicle except the driver) in the vehicle according to seats of users in the vehicle, where one in the driver's seat is the driver and those in other seats are the at least one passenger. Alternatively, the picture can be analyzed to recognize the driver and at least one passenger according to a preset photo of the driver. Thereafter, an image of the driver and images of the at least one passenger are extracted from the picture, the image of the driver is analyzed to obtain facial features of the driver, and the facial features of the driver are input into a preset emotion model to obtain the emotional state of the driver. Emotional states of the at least one passenger are determined with the same processing method as that of the driver.

As another example, when the content is obtained according to a recorded video about a scenario in the vehicle, pictures in the video may be analyzed to recognize the driver and at least one passenger (other users in the vehicle except the driver) in the vehicle. Thereafter, the emotional state of the driver is determined according to voice and body movements of the driver, and the emotional states of the at least one passenger are determined according to voice and body movements of the at least one passenger.

The above recognition methods are only illustrative. In fact, other methods can also be used to recognize the emotional states of the at least one user in the vehicle, which is not limited herein.

At block 205, first multimedia push information is generated according to the duration that the vehicle is in the congestion state, the emotional state of the driver, and at least one of previous play records of the vehicle or previous play records of an electronic device communicating with the vehicle, and second multimedia push information is generated according to the duration that the vehicle is in the congestion state, the emotional states of the other users in the vehicle, and data in at least one of a database of the vehicle or a database of the electronic device.

For example, upon determining that the emotional state of the driver is anxiety, and the duration that the vehicle is in the congestion state is 5 minutes, if there is a light music of about 5 minutes in the previous play records that can calm the driver down, the first multimedia push information of playing the light music can be generated for the driver, where the previous play records are previous play records of the vehicle or previous play records of the electronic device. For another example, upon determining that the emotional state of one of the at least one passenger is crying (for example, the at least one passenger may be a child or may include a child), and the duration that the vehicle is in the congestion state is 5 minutes, if there is a children's song of about 5 minutes in the database, a second multimedia push information of playing the children's song can be generated for the at least one passenger in the vehicle.

At block 206, the first multimedia push information is displayed before the second multimedia push information.

The display manner of the multimedia information includes but is not limited to background notifications, short messages, auto popup windows and so on. The multimedia information can be successively displayed, and then content of the multimedia information may be played according to a choice of the driver after displayed. In one example, the second multimedia push information may be displayed before the first multimedia push information. The multimedia information pushed includes but is not limited to music, a radio show, a video, a short film, or the like.

The process of pushing the multimedia information will be described with a specific example as follows. For example, a driver goes travel with their families (including a child). When they leave, a navigation system on a mobile phone is launched. Upon detecting that the vehicle is in a congestion state, navigation data of the vehicle is obtained, duration that the vehicle is in the congestion state is estimated, and a camera may be automatically launched to record a video of the scenario in the vehicle. The emotional state of the driver and the emotional state of the child in the vehicle may be determined by analyzing the video recorded. For example, when the vehicle is in the congestion state, the driver feels boring, and the duration that the vehicle is in the congestion state is estimated about 40 minutes, the first multimedia push information of playing a certain TV series is generated for the driver according to the at least one of previous play records of the vehicle or previous play records of the electronic device (for example, the driver is interested in a certain TV series recently). For another example, when the child is crying and the duration that the vehicle is in the congestion state is estimated about 40 minutes, the second multimedia push information of playing an animated cartoon of about 40 minutes is generated for the child according to data in the database. The first multimedia push information and the second multimedia push information are displayed in background, such that the driver can make a selection. For example, if the driver chooses to watch the first multimedia push information and confirms to play content of the first multimedia push information, play the TV series. For another example, if the driver chooses to watch the second multimedia push information and confirms to play content of the second multimedia push information, play the animated cartoon.

In at least one implementation, when at least one of following conditions changes: the duration that the vehicle is in the congestion state and the emotional states of the at least one user (including the driver and at least one passenger) in the vehicle, another multimedia information is pushed. For example, if the previously estimated duration that the vehicle is in the congestion state is 5 minutes, a light music is recommended to the at least one user in the vehicle. However, 5 minutes later, the duration that the vehicle is in the congestion state may become 30 minutes, and then a short film of about 30 minutes may be recommended to the at least one user in the vehicle.

In at least one implementation, upon detecting that the vehicle is in the traveling state and the vehicle is traveling at a speed higher than the preset speed threshold within the preset time period, it means that the congested road is clear, and in this case, the push of the multimedia information may be stopped so that the driver can concentrate on driving.

According to implementations, the method for pushing multimedia information is applicable to an electronic device, to detect whether the vehicle is in the traveling state. Upon detecting that the vehicle is in the traveling state and the vehicle is traveling at the speed lower than the preset speed threshold within the preset time period, the navigation data of the vehicle is obtained. The duration that the vehicle is in the congestion state is estimated according to the navigation data. Collect scene information in the vehicle, and push multimedia information according to the duration that the vehicle is in the congestion state and the scene information in the vehicle. With the foregoing method, upon detecting that the vehicle is traveling on the congested road, it is possible to push some multimedia information for the at least one user in the vehicle according to the duration that the vehicle is in the congestion state and the emotional states of the at least one user in the vehicle. As such, the emotional states of the at least one user in the vehicle may be improved when the vehicle is traveling on the congested road, the push of the multimedia information may be intelligent, and the travel comfort experience may be improved.

In some implementations, an apparatus for pushing multimedia information is provided. The apparatus includes an obtaining module, a calculating module, a collecting module, and a push module. The obtaining module is configured to obtain navigation data of a vehicle, upon detecting that the vehicle is in a traveling state and the vehicle is traveling at a speed lower than a preset speed threshold within a preset time period. The calculating module is configured to estimate duration that the vehicle is in a congestion state according to the navigation data. The collecting module is configured to collect scene information in the vehicle. The push module is configured to push multimedia information according to duration that the vehicle is in the congestion state and the scene information in the vehicle.

In at least one implementation, the push module includes an analyzing sub-module and a push sub-module. The analyzing sub-module is configured to determine emotional states of at least one user in the vehicle by analyzing the scene information in the vehicle. The push sub-module is configured to push the multimedia information according to the duration that the vehicle is in the congestion state and the emotional states of the at least one user in the vehicle.

In at least one implementation, the push sub-module is further configured to stop pushing the multimedia information, upon detecting that the vehicle is in the traveling state and the vehicle is traveling at a speed higher than the preset speed threshold within the preset time period.

In at least one implementation, the emotional states of the at least one user in the vehicle include an emotional state of a driver and emotional states of other users in the vehicle. The push sub-module includes a generating sub-module and a display sub-module. The generating sub-module is configured to generate first multimedia push information according to the duration that the vehicle is in the congestion state, the emotional state of the driver, and at least one of previous play records of the vehicle or previous play records of the electronic device, and generate second multimedia push information according to the duration that the vehicle is in the congestion state, the emotional states of the other users in the vehicle, and data in at least one of a database of the vehicle or a database of the electronic device. The display sub-module is configured to display the first multimedia push information and the second multimedia push information sequentially.

In at least one implementation, the display sub-module is configured to display the first multimedia push information before the second multimedia push information.

Figure 4:
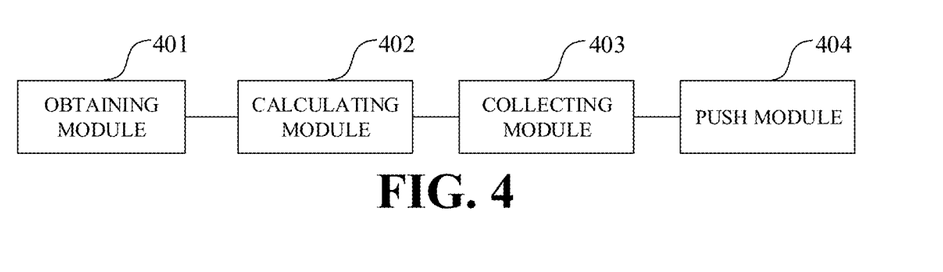
FIG. 4 is a schematic structural diagram illustrating an apparatus for pushing multimedia information according to at least one implementation.

In some implementations, an apparatus for pushing multimedia information is provided. The apparatus may be integrated into an electronic device. The electronic device may be a smart phone, a tablet PC, or other kinds of smart electronic devices. As illustrated in FIG. 4, the apparatus includes an obtaining module 401, a calculating module 402, a collecting module 403, and a push module 404. The obtaining module 401 is configured to obtain navigation data of a vehicle, upon detecting that the vehicle is in a traveling state and the vehicle is traveling at a speed lower than a preset speed threshold within a preset time period. The calculating module 402 is configured to estimate duration that the vehicle is in a congestion state according to the navigation data. The collecting module 403 is configured to collect scene information in the vehicle. The push module 404 is configured to push multimedia information according to the duration that the vehicle is in the congestion state and the scene information in the vehicle.

Figure 5:
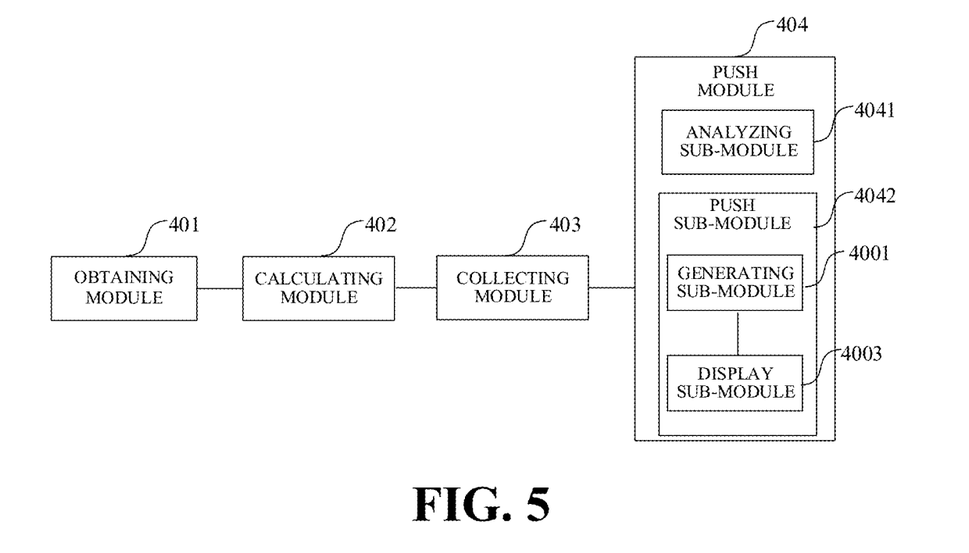
FIG. 5 is another schematic structural diagram illustrating an apparatus for pushing multimedia information according to at least one implementation.

In at least one implementation, as illustrated in FIG. 5, the push module 404 includes an analyzing sub-module 4041 and a push sub-module 4042. The analyzing sub-module 4041 is configured to determine emotional states of at least one user in the vehicle by analyzing the scene information in the vehicle collected by the collecting module 403. The push sub-module 4042 is configured to push the multimedia information according to the duration that the vehicle is in the congestion state and the emotional states of the at least one user in the vehicle.

In at least one implementation, the push sub-module 4042 is further configured to stop pushing the multimedia information, upon detecting that the vehicle is in the traveling state and the vehicle is traveling at a speed higher than the preset speed threshold within the preset time period.

In at least one implementation, the emotional states of the at least one user in the vehicle include an emotional state of a driver and emotional states of other users in the vehicle. The push sub-module 4042 includes a generating sub-module 4001 and a display sub-module 4003. The generating sub-module 4001 is configured to generate first multimedia push information according to the duration that the vehicle is in the congestion state, the emotional state of the driver, and at least one of previous play records of the vehicle or previous play records of the electronic device communicating with the vehicle, and generate second multimedia push information according to the duration that the vehicle is in the congestion state, the emotional states of the other users in the vehicle, and data in at least one of a database of the vehicle or a database of the electronic device. The display sub-module 4003 is configured to display the first multimedia push information and the second multimedia push information sequentially.

In at least one implementation, the display sub-module 4003 is configured to display the first multimedia push information before the second multimedia push information.

As can be seen, the apparatus is applicable to the electronic device, to detect the traveling state of the vehicle. The obtaining module 401 is configured to obtain the navigation data of the vehicle, upon detecting that the vehicle is in the traveling state and the vehicle is traveling at the speed lower than the preset speed threshold within the preset time period. The calculating module 402 is configured to estimate the duration that the vehicle is in the congestion state according to the navigation data. The collecting module 403 is configured to collect the scene information in the vehicle. The push module 404 is configured to push the multimedia information according to the duration that the vehicle is in the congestion state and the scene information in the vehicle. In this way, once road congestion occurs, the push module 404 can push the multimedia information for the at least one user in the vehicle according to the duration that the vehicle is in the congestion state and the emotional states of the at least one user in the vehicle, such that the emotional states of the at least one user in the vehicle may be improved when the vehicle is traveling on the congested road, the push of the multimedia information may be intelligent, and the travel comfort experience may be improved.

For the specific implementation, the foregoing modules may be implemented as a separate entity, or may be implemented in any combination, or may be implemented as the same or a plurality of entities. For the specific implementation of the foregoing modules, reference to the foregoing method implementations and details are not described herein again.

According to implementations, an electronic device is provided. The electronic device includes a processor, a memory, a display screen, and a control circuit. The processor is electrically connected to the memory, the display screen, and the control circuit, where the memory is configured to store instructions and data. The display screen is configured to display information, and the control circuit is configured to control the display screen to display information. The processor is configured to operate as follows. The processor is configured to obtain navigation data of a vehicle, upon detecting that the vehicle is in a traveling state and the vehicle is traveling at a speed lower than a preset speed threshold within a preset time period. The processor is configured to estimate duration that the vehicle is in a congestion state of the vehicle according to the navigation data. The processor is configured to collect scene information in the vehicle. The processor is configured to push multimedia information according to the duration that the vehicle is in the congestion state and the scene information in the vehicle.

Figure 6:
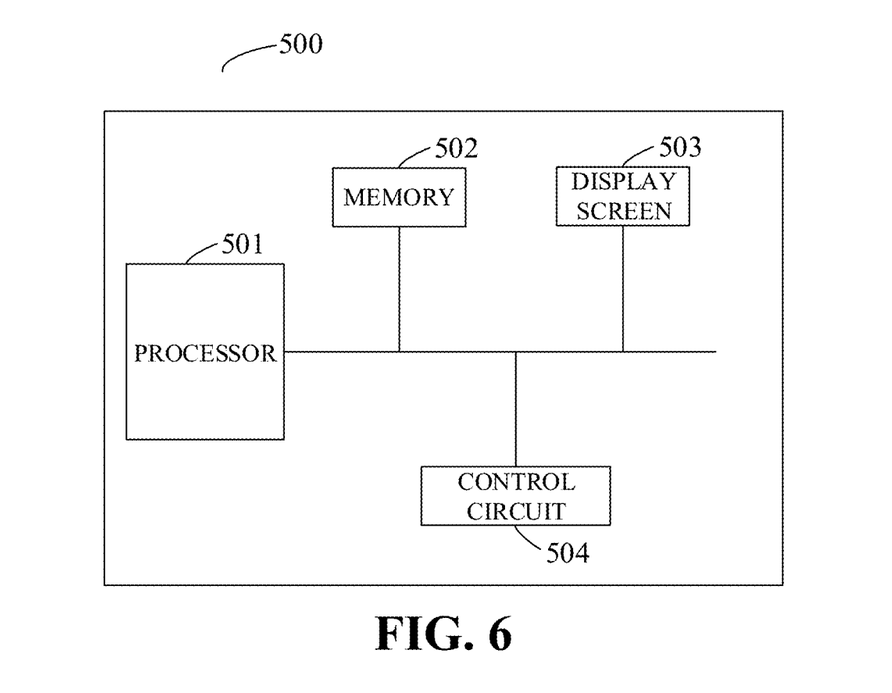
FIG. 6 is a schematic structural diagram illustrating an electronic device according to at least one implementation.

According to implementations, an electronic device is provided. The electronic device may be a smart phone or a tablet PC. As illustrated in FIG. 6, the electronic device 500 includes a processor 501, a memory 502, a display screen 503, and a control circuit 504. The processor 501 is electrically connected to the memory 502, the display screen 503, and the control circuit 504.

The processor 501 is a control center of the electronic device 500. The processor 501 is configured to connect various parts of the entire electronic device through various interfaces and lines, and to execute various functions of the electronic device and process data by running or executing computer programs stored in the memory 502 and invoking data stored in the memory 502, thereby monitoring the electronic device as a whole.

In some implementations, the processor 501 in the electronic device 500 is configured to execute computer programs stored in the memory 502 by loading instructions corresponding to processes of one or more computer programs into the memory 502 to achieve various functions of the electronic device 500. The processor 501 is configured to operate as follows. The processor 501 is configured to obtain navigation data of a vehicle, upon detecting that the vehicle is in a traveling state and the vehicle is traveling at a speed lower than a preset speed threshold within a preset time period. The processor 501 is configured to estimate duration that the vehicle is in a congestion state of the vehicle according to the navigation data. The processor 501 is configured to collect scene information in the vehicle. The processor 501 is configured to push multimedia information according to the duration that the vehicle is in the congestion state and the scene information in the vehicle.

In at least one implementation, the multiple instructions operable with the processor 501 to estimate the duration that the vehicle is in the congestion state according to the navigation data are operable with the processor 501 to obtain a length of a congested road on which the vehicle is currently traveling according to the navigation data, and estimate the duration that the vehicle is in the congestion state according to the length of the congested road and a current traveling speed of the vehicle. Alternatively, the multiple instructions operable with the processor 501 to estimate the duration that the vehicle is in the congestion state according to the navigation data are operable with the processor 501 to obtain the number of vehicles on the congested road according to the navigation data and estimate the duration that the vehicle is in the congestion state according to the number of vehicles on the congested road.

In at least one implementation, the multiple instructions operable with the processor 501 to push the multimedia information according to the duration that the vehicle is in the congestion state and the scene information in the vehicle are operable with the processor 501 to: determine emotional states of at least one user in the vehicle by analyzing the scene information in the vehicle; push the multimedia information according to the duration that the vehicle is in the congestion state and the emotional states of the at least one user in the vehicle.

In at least one implementation, the multiple instructions are further operable with the processor 501 to push another multimedia information when at least one of following conditions changes: the duration that the vehicle is in the congestion state and the emotional states of the at least one user in the vehicle.

In at least one implementation, the multiple instructions are further operable with the processor 501 to stop pushing the multimedia information, upon detecting that the vehicle is in the traveling state and the vehicle is traveling at a speed higher than the preset speed threshold within the preset time period.

In at least one implementation, the emotional states of the at least one user in the vehicle include an emotional state of a driver and emotional states of other users in the vehicle, and the multiple instructions operable with the processor 501 to push the multimedia information according to the duration that the vehicle is in the congestion state and the emotional states of the at least one user in the vehicle are operable with the processor 501 to: generate first multimedia push information according to the duration that the vehicle is in the congestion state, the emotional state of the driver, and at least one of previous play records of the vehicle or previous play records of the electronic device communicating with the vehicle, and generate second multimedia push information according to the duration that the vehicle is in the congestion state, the emotional states of the other users in the vehicle, and data in at least one of a database of the electronic device; display the first multimedia push information and the second multimedia push information sequentially.

In at least one implementation, the multiple instructions are further operable with the processor 501 to display the first multimedia push information before the second multimedia push information.

The memory 502 is configured to store computer programs and data. The computer programs stored in the memory 502 contain instructions executable in the processor 501. The computer programs may be combined into various functional modules. The processor 501 is configured to execute various function applications and data processing by running the computer programs stored in the memory 502.

The display screen 503 may be configured to display information entered by a user or information provided to the user and various graphical user interfaces of the electronic device, which may be composed of images, text, icons, video, and any combination thereof.

The control circuit 504 is electrically coupled to the display screen 503, and configured to control the display screen 503 to display information.

Figure 7:
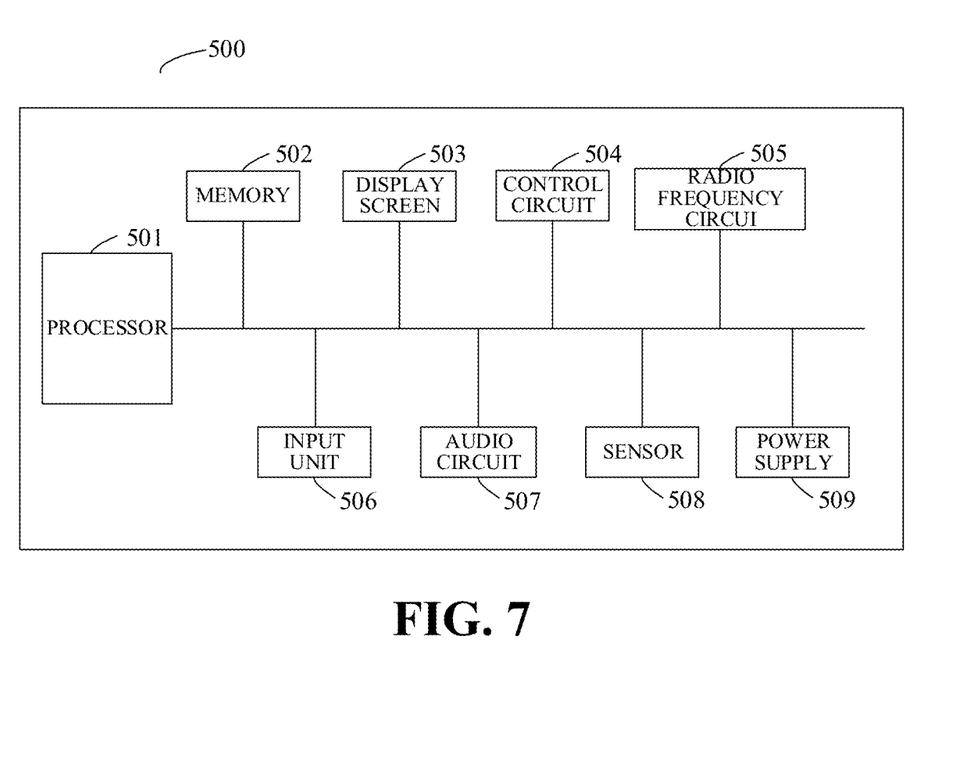
FIG. 7 is another schematic structural diagram illustrating an electronic device according to at least one implementation.

In some examples, as illustrated in FIG. 7, the electronic device 500 further includes a radio frequency circuit 505, an input unit 506, an audio circuit 507, a sensor 508, and a power supply 509. The processor 501 is electrically coupled to the radio frequency circuit 505, the input unit 506, the audio circuit 507, the sensor 508, and the power supply 509 respectively.

The radio frequency circuit 505 is configured to receive and send a radio-frequency signal. The radio frequency circuit 505 is configured to communicate with a network device or other electronic devices through wireless communication, to receive and send signals with network devices or other electronic devices.

The input unit 506 is configured to receive input digits, character information, or user characteristic information (e.g., fingerprints), and to generate keyboard, mouse, joystick, optical, or trackball signal inputs that are related to user settings and function controls. The input unit 506 may include a fingerprint recognition module.

The audio circuit 507 may provide an audio interface between the user and the electronic device through a speaker and a microphone.

The sensor 508 is configured to collect external environment information. The sensor 508 may include one or more of an ambient brightness sensor, an acceleration sensor, a gyroscope, and the like.

The power supply 509 is configured to provide power for various components of the electronic device 500. In some implementations, the power supply 509 may be logically coupled to the processor 501 through a power management system to enable functions such as managing charging, discharging, and power management through the power management system.

Although not shown in FIG. 7, the electronic device 500 may further include a camera, a Bluetooth module, and the like, and details are not described herein again.

According to the electronic device, the traveling state of the vehicle is detected. Upon detecting that the vehicle is in the traveling state and the vehicle is traveling at the speed lower than the preset speed threshold within the preset time period, the navigation data of the vehicle is obtained. The duration that the vehicle is in the congestion state is estimated according to the navigation data. Collect scene information in the vehicle and push multimedia information according to the duration that the vehicle is in the congestion state and the scene information in the vehicle. With the above method, upon detecting that the vehicle is traveling on the congested road, it is possible to push multimedia information for the at least one user in the vehicle according to the duration that the vehicle is in the congestion state and the emotional states of the at least one user in the vehicle, such that the emotional states of the at least one user in the vehicle may be improved when road congestion occurs, and the push of the multimedia information may be intelligent.

It should be noted that, one of ordinary skilled in the art will appreciate that all or part of the operations in various methods of the above-described implementations can be accomplished by a computer program to instruct related hardware. The computer program may be stored in a computer readable storage medium, for example, the computer program may be stored in a memory of the electronic device. The computer program may be executed by at least one processor in the electronic device, and a flow such as an implementation of the information distribution method may be included in the execution. The storage medium may include, but is not limited to, a read only memory (ROM), a random access memory (RAM), a magnetic disk, or an optical disk.

According to the implementations, the method and apparatus for pushing multimedia information, the storage medium, and the electronic device are described in detail. The functional modules may be integrated into one processing chip, or each module may exist physically or separately. More than two modules are integrated as one module. The above integrated modules can be implemented in the form of hardware or in the form of software functional modules. The principles and implementations of the disclosure are described herein with reference to specific examples. The description of the above implementations is only for the purpose of understanding the method of the disclosure and the core idea thereof. In addition, for those skilled in the art, there will be changes in the specific implementation methods and application scope according to the idea of the disclosure. In summary, the contents of this specification should not be construed as limitations of the disclosure.

What is claimed is:

1. A method for pushing multimedia information, comprising:
   obtaining navigation data of a vehicle, upon detecting that the vehicle is in a traveling state and the vehicle is traveling at a speed lower than a preset speed threshold within a preset time period;
   estimating duration that the vehicle is in a congestion state according to the navigation data;
   collecting scene information in the vehicle, wherein the scene information in the vehicle comprises at least one of sounds, videos, or images collected within the vehicle; and
   pushing multimedia information according to the duration that the vehicle is in the congestion state and the scene information in the vehicle, comprising:
      generating first multimedia push information according to the duration that the vehicle is in the congestion state, an emotional state of a driver of the vehicle, and at least one of previous play records of the vehicle or previous play records of an electronic device communicating with the vehicle;
      generating second multimedia push information according to the duration that the vehicle is in the congestion state, emotional states of other users in the vehicle, and data in at least one of a database of the vehicle or a database of the electronic device; and
      controlling at least one display screen to display the first multimedia push information and the second multimedia push information sequentially.

2. The method of claim 1, wherein estimating the duration that the vehicle is in the congestion state comprises:
   obtaining a length of a congested road on which the vehicle is currently traveling according to the navigation data; and
   estimating the duration that the vehicle is in the congestion state according to the length of the congested road and a current traveling speed of the vehicle.

3. The method of claim 1, wherein estimating the duration that the vehicle is in the congestion state comprises:
   obtaining a number of vehicles on a congested road according to the navigation data; and
   estimating the duration that the vehicle is in the congestion state according to the number of vehicles on the congested road.

4. The method of claim 1, wherein pushing the multimedia information according to the duration that the vehicle is in the congestion state and the scene information in the vehicle comprises:
   determining emotional states of at least one user in the vehicle by analyzing the scene information in the vehicle; and
   pushing the multimedia information according to the duration that the vehicle is in the congestion state and the emotional states of the at least one user in the vehicle.

5. The method of claim 4, further comprising:
   pushing another multimedia information when at least one of the following conditions changes: the duration that the vehicle is in the congestion state or the emotional states of the at least one user in the vehicle.

6. The method of claim 4, further comprising:
   stopping pushing the multimedia information, upon detecting that the vehicle is in the traveling state and the vehicle is traveling at a speed higher than the preset speed threshold within the preset time period.

7. The method of claim 1, further comprising:
   displaying the first multimedia push information before the second multimedia push information.

8. An electronic device, comprising:
   a processor; and
   a memory configured to store a plurality of instructions;
   the plurality of instructions which, when executed, are operable with the processor to:
   obtain navigation data of a vehicle, upon detecting that the vehicle is in a traveling state and the vehicle is traveling at a speed lower than a preset speed threshold within a preset time period;
   estimate duration that the vehicle is in a congestion state according to the navigation data;
   collect scene information in the vehicle, wherein the scene information in the vehicle comprises at least one of sounds, videos, or images in the vehicle; and
   push multimedia information according to the duration that the vehicle is in the congestion state and the scene information collected within the vehicle, comprising:
      generate first multimedia push information according to the duration that the vehicle is in the congestion state, an emotional state of a driver of the vehicle, and at least one of previous play records of the vehicle or previous play records of the electronic device communicating with the vehicle;
      generate second multimedia push information according to the duration that the vehicle is in the congestion state, emotional states of other users in the vehicle, and data in at least one of a database of the vehicle or a database of the electronic device; and
      control at least one display screen to display the first multimedia push information and the second multimedia push information sequentially.

9. The electronic device of claim 8, wherein the plurality of instructions operable with the processor to estimate the duration that the vehicle is in the congestion state are operable with the processor to:
   obtain a length of a congested road on which the vehicle is currently traveling according to the navigation data; and
   estimate the duration that the vehicle is in the congestion state according to the length of the congested road and a current traveling speed of the vehicle.

10. The electronic device of claim 8, wherein the plurality of instructions operable with the processor to estimate the duration that the vehicle is in the congestion state are operable with the processor to:
    obtain a number of vehicles on a congested road according to the navigation data; and
    estimate the duration that the vehicle is in the congestion state according to the number of vehicles on the congested road.

11. The electronic device of claim 8, wherein the plurality of instructions operable with the processor to push the multimedia information according to the duration that the vehicle is in the congestion state and the scene information in the vehicle are operable with the processor to:
    determine emotional states of at least one user in the vehicle by analyzing the scene information in the vehicle; and
    push the multimedia information according to the duration that the vehicle is in the congestion state and the emotional states of the at least one user in the vehicle.

12. The electronic device of claim 11, wherein the plurality of instructions are further operable with the processor to:
 push another multimedia information when at least one of following conditions changes:
 the duration that the vehicle is in the congestion state and the emotional states of the at least one user in the vehicle.

13. The electronic device of claim 11, wherein the plurality of instructions are further operable with the processor to:
 stop pushing the multimedia information, upon detecting that the vehicle is in the traveling state and the vehicle is traveling at a speed higher than the preset speed threshold within the preset time period.

14. The electronic device of claim 8, wherein the plurality of instructions are further operable with the processor to:
 display the first multimedia push information before the second multimedia push information.

15. A non-transitory computer readable storage medium applicable to an electronic device and configured to store computer programs;
 the computer programs, when executed, being operable with a computer to:
 obtain navigation data of a vehicle, upon detecting that the vehicle is in a traveling state and the vehicle is traveling at a speed lower than a preset speed threshold within a preset time period;
 estimate duration that the vehicle is in a congestion state according to the navigation data;
 collect scene information in the vehicle, wherein the scene information in the vehicle comprises at least one of sounds, videos, or images collected within the vehicle; and
 push multimedia information according to the duration that the vehicle is in the congestion state and the scene information in the vehicle, comprising:
 generate first multimedia push information according to the duration that the vehicle is in the congestion state, an emotional state of the driver of the vehicle, and at least one of previous play records of the vehicle or previous play records of the electronic device communicating with the vehicle;
 generate second multimedia push information according to the duration that the vehicle is in the congestion state, emotional states of other users in the vehicle, and data in at least one of a database of the vehicle or a database of the electronic device; and
 control at least one display screen to display the first multimedia push information and the second multimedia push information sequentially.

16. The non-transitory computer readable storage medium of claim 15, wherein the computer programs operable with the computer to estimate the duration that the vehicle is in the congestion state are operable with the computer to:
 obtain a length of a congested road on which the vehicle is currently traveling according to the navigation data; and
 estimate the duration that the vehicle is in the congestion state according to the length of the congested road and a current traveling speed of the vehicle.

17. The non-transitory computer readable storage medium of claim 15, wherein the computer programs operable with the computer to estimate the duration that the vehicle is in the congestion state are operable with the computer to:
 obtain a number of vehicles on a congested road according to the navigation data; and
 estimate the duration that the vehicle is in the congestion state according to the number of vehicles on the congested road.

18. The non-transitory computer readable storage medium of claim 15, wherein the computer programs operable with the computer to push the multimedia information according to the duration that the vehicle is in the congestion state and the scene information in the vehicle are operable with the computer to:
 determine emotional states of at least one user in the vehicle by analyzing the scene information in the vehicle; and
 push the multimedia information according to the duration that the vehicle is in the congestion state and the emotional states of the at least one user in the vehicle.

* * * * *